US006405226B1

(12) United States Patent
Alpert et al.

(10) Patent No.: US 6,405,226 B1
(45) Date of Patent: *Jun. 11, 2002

(54) SYSTEM AND METHOD FOR TAGGABLE DIGITAL PORTFOLIO CREATION AND REPORT GENERATION

(75) Inventors: Sherman Robert Alpert, Briarcliff Manor, NY (US); James William Cooper, Wilton, CT (US); Peter Gustav Fairweather, Yorktown Heights, NY (US); Richard Bruce Lam, Ridgefield, CT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/410,352

(22) Filed: Sep. 30, 1999

Related U.S. Application Data

(63) Continuation of application No. 08/810,796, filed on Mar. 5, 1997, now Pat. No. 6,092,081.

(51) Int. Cl.[7] .............................................. G06F 17/21
(52) U.S. Cl. ........................................ 707/530; 707/512
(58) Field of Search ............................. 707/500, 501.1, 707/512, 530

(56) References Cited

U.S. PATENT DOCUMENTS

| | | | |
|---|---|---|---|
| 5,524,193 A | 6/1996 | Covington et al. | 395/154 |
| 5,621,871 A | 4/1997 | Jaremko et al. | 395/141 |
| 5,671,428 A | 9/1997 | Muranaga et al. | 395/772 |
| 5,706,502 A | 1/1998 | Foley et al. | 395/610 |
| 5,724,595 A | 3/1998 | Gentner | 395/762 |
| 5,730,604 A | 3/1998 | Jay et al. | 434/365 |
| 5,802,299 A | 9/1998 | Logan et al. | 395/200.48 |
| 5,809,250 A * | 9/1998 | Kisor | 709/227 |
| 5,845,299 A | 12/1998 | Arora et al. | 707/513 |
| 5,845,301 A | 12/1998 | Rivette et al. | 707/512 |
| 5,893,126 A * | 4/1999 | Drews et al. | 707/512 |
| 6,014,677 A * | 1/2000 | Hayashi et al. | 707/501.1 |
| 6,041,335 A * | 3/2000 | Merritt et al. | 707/512 |
| 6,088,709 A * | 7/2000 | Watanabe | 707/512 |
| 6,092,081 A * | 7/2000 | Alpert et al. | 707/104 |
| 6,154,757 A * | 11/2000 | Krause et al. | 707/530 |
| 6,178,431 B1 * | 1/2001 | Douglas | 707/512 |
| 6,240,444 B1 * | 5/2001 | Fin et al. | 709/205 |

OTHER PUBLICATIONS

Tim Pyron et al., "Using Microsoft Project 4 For Windows", 1994 by Que Corporation, pp. 106, 114, 357–358, 379, 552, 554, 561–562 and 653.

M Young et al., "Wordperfect 6.1 For Windows for Dummies", 1994 by IDG Books Worldwide, pp. 381–382.

"Multimedia Student & Teacher Portfolio Authentic Assessment Developer Curriculum Resource Manager", Personal Plus, Feb. 17, 1997.

T. R. Sizer, "Horace's Compromise—The Dilemma of the American High School", Houghton Mifflin Co., Boston, MA 02108, pp. 214–215, 1984.

* cited by examiner

Primary Examiner—Stephen S. Hong
(74) Attorney, Agent, or Firm—Whitham, Curtis & Christofferson, P.C.; Louis J. Percello

(57) ABSTRACT

A visual metaphor is provided on a computer and/or network environment for tagging documents with various types of (education) commentary to an author's (student's) work and indications of (educational) goals that have been or are to be achieved. One or more of the comments and goals are based on predetermined standards. The goals or comments are optionally weighted. Summaries of these goals can be generated to assist evaluators (teachers and administrators) in evaluating both the work of the authors (students) and the success of evaluator in managing (teaching the authors (students).

19 Claims, 8 Drawing Sheets

| | | |
|---|---|---|
| 0 | Basic Communication and Math Skills | 100 |
| 1 | Accessing Sources of Information | 25 |
| 1 | Gathering information and ideas | 35 |
| 2 | Reading | 5 |
| 2 | Observing | 5 |
| 2 | Listening | 5 |
| 1 | Processing Information | 25 |
| 2 | Quantifying | 5 |

410

| Key 411 | Goal 412 | Parent 415 |
|---|---|---|
| 1 | Basic Communication and Math Skills | 0 |
| 2 | Accessing Sources of Information | 1 |
| 3 | Gathering information and ideas | 1 |
| 4 | Reading | 3 |
| 5 | Observing | 3 |
| 6 | Listening | 3 |
| 7 | Processing Information | 1 |
| 8 | Quantifying | 7 |

420

| Key 411 | Importance 425 |
|---|---|
| 1 | 100 |
| 2 | 25 |
| 3 | 35 |
| 4 | 5 |
| 5 | 5 |
| 6 | 5 |
| 7 | 25 |
| 8 | 5 |

430

| Key | Child |
|---|---|
| 1 | 2 |
| 1 | 3 |
| 1 | 7 |
| 3 | 4 |
| 3 | 5 |

FIG.5

Internal structure of tags:

510

We have investigated <goal ="Research skills" weight= 4> the downtown area and have decided that the Belleview section of the waterfront can be developed into an attractive park useful <comment=awkward> to all of the town's citizens <comment=spelling>.

Display of tagged information when user clicks on boxes.

520

We have investigated [▓] the downtown area and have decided that the Belleview section of the waterfront can be developed into an attractive park useful [▓] to all of the town's citizens. [▓]

Research skills [4]

spelling awkward

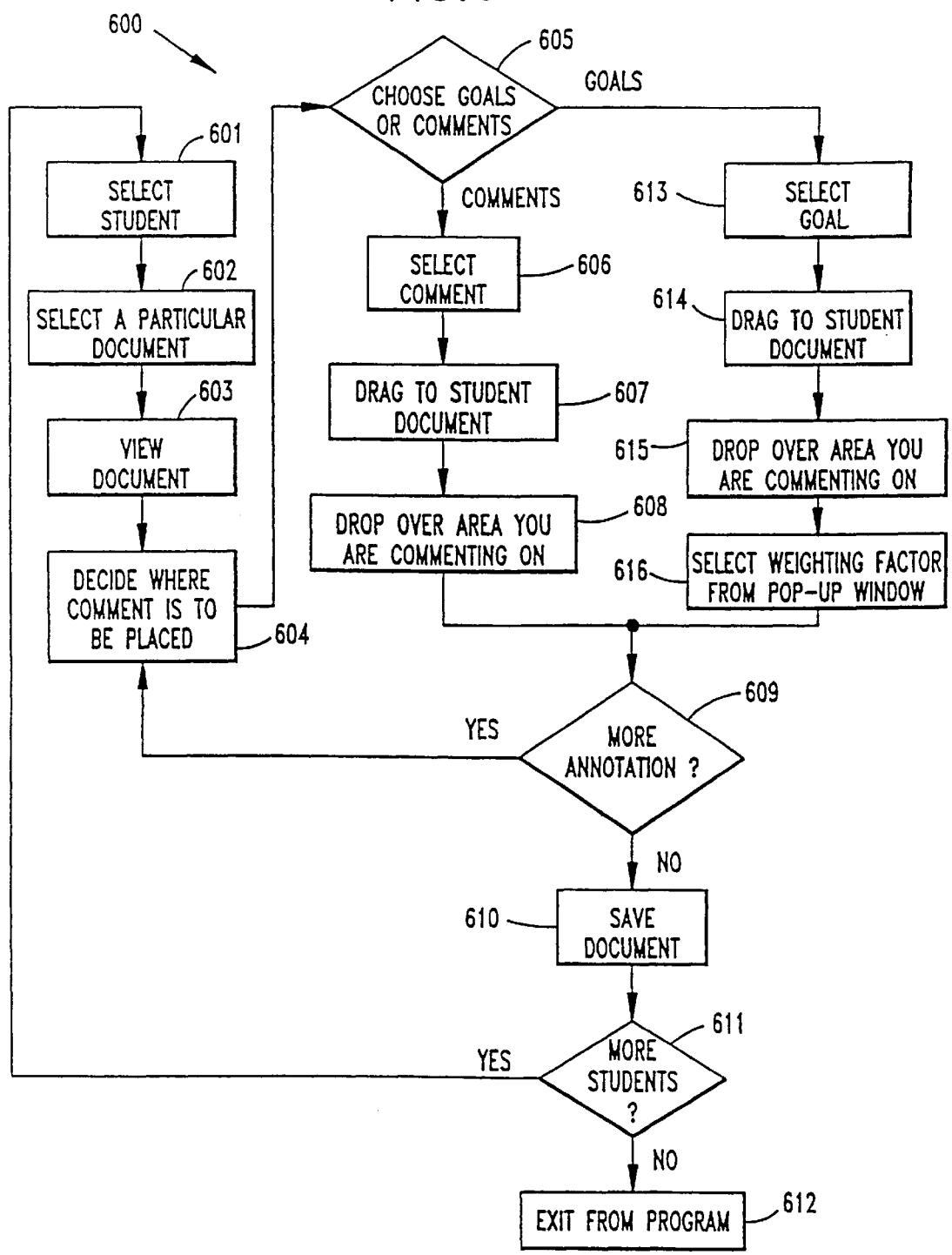

| Student Document |
|---|
| This is a report on my cat. She is very fuzzy Use longer sentences.(75) |

705 / 710

| Student Key | Document Key | Comment Key | Weight |
|---|---|---|---|
| 12 | 9 | 3 | 75 |

720

| Key | Comments |
|---|---|
| 1 | Spelling! |
| 2 | Awkward |
| 3 | Use longer sentences |

730

| Student Document |
|---|
| This is a report on my cat. She is very fuzzy. Careful use of grammar(65) |

707 / 740

| Student Key | Document Key | Goal Key | Weight |
|---|---|---|---|
| 12 | 9 | 2 | 65 |

750

| Key | Goals |
|---|---|
| 1 | Creative use of language |
| 2 | Careful use of grammar. |
| 3 | Able to express thoughts clearly |

760

| Goal Key | Importance |
|---|---|
| 1 | 90 |
| 2 | 80 |
| 3 | 75 |

770

SYSTEM AND METHOD FOR TAGGABLE DIGITAL PORTFOLIO CREATION AND REPORT GENERATION

CROSS REFERENCE TO RELATED APPLICATIONS

This application is a continuation of application Ser. No. 08/810,796, now U.S. Pat. No. 6,092,081, filed on Mar. 5, 1997, by Sherman R. Alpert et al. and assigned to a common assignee, the entire subject matter of which is incorporated herein by reference.

FIELD OF THE INVENTION

This invention relates to the field of searchable digital libraries. More specifically, this invention relates to the method for tagging both text and multimedia objects in a student project with regard to goals attained and quality of their attainment.

BACKGROUND OF THE INVENTION

A portfolio is a collection of work. For our purposes, this work is done by an author, e.g. a student, and is reviewed by one or more evaluators, e.g. a teacher and/or others, to assess the work, e.g. the progress of the student in learning a particular subject. Most of the prior art has dealt with hard copy portfolios. However, modern approaches use digital representations of work/portfolios.

The field of digital portfolios is a relatively new one. The concept of using portfolios of student work as part of student evaluations was described in Theodore Sizer's 1988 book, "Horace's Compromise." In this book, Sizer describes the dilemma of a typical high school teacher in attempting to teach and evaluate students with wide ranges of abilities using classical teaching methods. He proposes the concept of student portfolios of work to replace the more rigid concepts of numerical or letter grades.

The Coalition of Essential Schools at Brown University has published some early work where scanned and computer generated documents are displayed as student works, and where teacher comments can be filed alongside the original documents. The Authentic Convergence Assessment Technologies proposed a product based on this "Coalition" approach called "Persona Plus". This product proposed to store student work in a database, where it could be recalled for evaluation by parents, teachers and others. It does not suggest annotation.

These approaches concern a multimedia display of one or more portfolios, made up of individual student projects where each project may contain text documents, as well as sound, graphics, and other multimedia clips. Such a portfolio could consist of a collection of files stored on various computer servers connected into a network.

Annotation of data files is generally known. Annotation of the HyperText Markup Language (HTML) data files used by World World Web (WWW) viewers is supported by the freeware Mosaic browser and a few others. Some browsers have had the capability of associating comments with these portfolios. However, such annotation is always stored locally on a single user's computer and does not become part of the original material in any way.

STATEMENT OF PROBLEMS WITH THE PRIOR ART

Prior art digital portfolios have dealt with student portfolios as if they were hard copy portfolios of a student's work. The teacher's commentary is encapsulated in a group of computer files rather than in a form where computer searching and reporting of such work may be possible. However, since the student portfolio is typically scanned text, there is no easy way to draw a correlation between the teacher's comments and particular points in that scanned text.

Most of the prior art has not disclosed a way to annotate student work in digital portfolios according to one or more predetermined measurements/standards, e.g. teacher's evaluations, educations goals, etc. Furthermore, most of the prior art does not disclose the processing of evaluation data or generating reports involving these measurements/standards.

Without annotations that conform to predetermined standards, it is difficult to accurately and effectively compare documents in a large work portfolio from one student and/or work in portfolios from a large number of students, e.g., with respect to those students and standards in other school districts.

Therefore, the prior art has difficulty processing information about large numbers of digital portfolios and comparing an individual student performance to a large group of students based on these standards. The prior art also has difficulty comparing documents of a student's work against their own previous work and relating the student's work to outside standards and/or students in other locations (e.g. school districts).

Further, this inability to process a large number of digital portfolios, with respect to predetermined standards, further makes it difficult to assess the performance of individual teachers, schools, and/or school systems.

In sum, the prior art graphical user interfaces (GUIs) used in networks dealing with digital portfolios do not have an easy to use technology to enable teachers (and/or other evaluators) to annotate student (author) work according to a predetermined set of (educational) standards and to evaluate and compare student (author) work based on those educational standards.

OBJECTS OF THE INVENTION

An object of this invention is an improved system and method for marking elements of an author's (student's) work directly with measurable, standardized (educational) goals and evaluator comments (e.g. teacher comments and other comments such as those from parents.)

An object of this invention is an improved system and method for creating a digital portfolio of author's (student's or other worker's) projects and for generating reports from that portfolio based on predetermined standards.

Another object of this invention is a system for generating reports, with optional weighting factors, regarding the number of goals which one or more authors (student) or groups of authors has achieved in one or more projects.

Another object of this invention is a network environment that is used to display, on a client workstation, author (student) portfolios that have been annotated by an evaluator according to a predetermined set of standards.

SUMMARY OF THE INVENTION

This invention is a system and method that provides a visual metaphor for tagging documents with various types of (education) commentary to an author's (student's) work and indication of (educational) goals that have been or are to be achieved. One or more of the comments and goals are based on predetermined standards.

In an alternative preferred embodiment, the invention drags goals and commentary phrases from a list of (customized/predetermined) goals or comments, optionally assigns a weight to each, and stores these as tags hidden within the document and attached to a project element (e.g. a phrase, a picture, or a multimedia clip). The goals and comments can be displayed by clicking on an indicator box using a selection device, e.g. a mouse.

Summaries of these goals can be generated to assist evaluators (teachers and administrators) in evaluating both the work of the authors (students) and the success of evaluator in managing (teaching) the authors (students.) A preferred network embodiment of the invention is disclosed.

BRIEF DESCRIPTION OF THE DRAWINGS

FIG. 4 is a block diagram of one preferred file structure used as a standard goals or commentary file.

FIG. 5 is a display of a document showing one embodiment of tagging information on a hypertext document using an extension of html tags.

FIG. 6 is a flow chart showing the process steps of creating a database of annotated author documents.

FIG. 7 is a block diagram of a database of annotated author documents created by the goal creating process of FIG. 6.

DETAILED DESCRIPTION OF THE INVENTION

Figure 1:
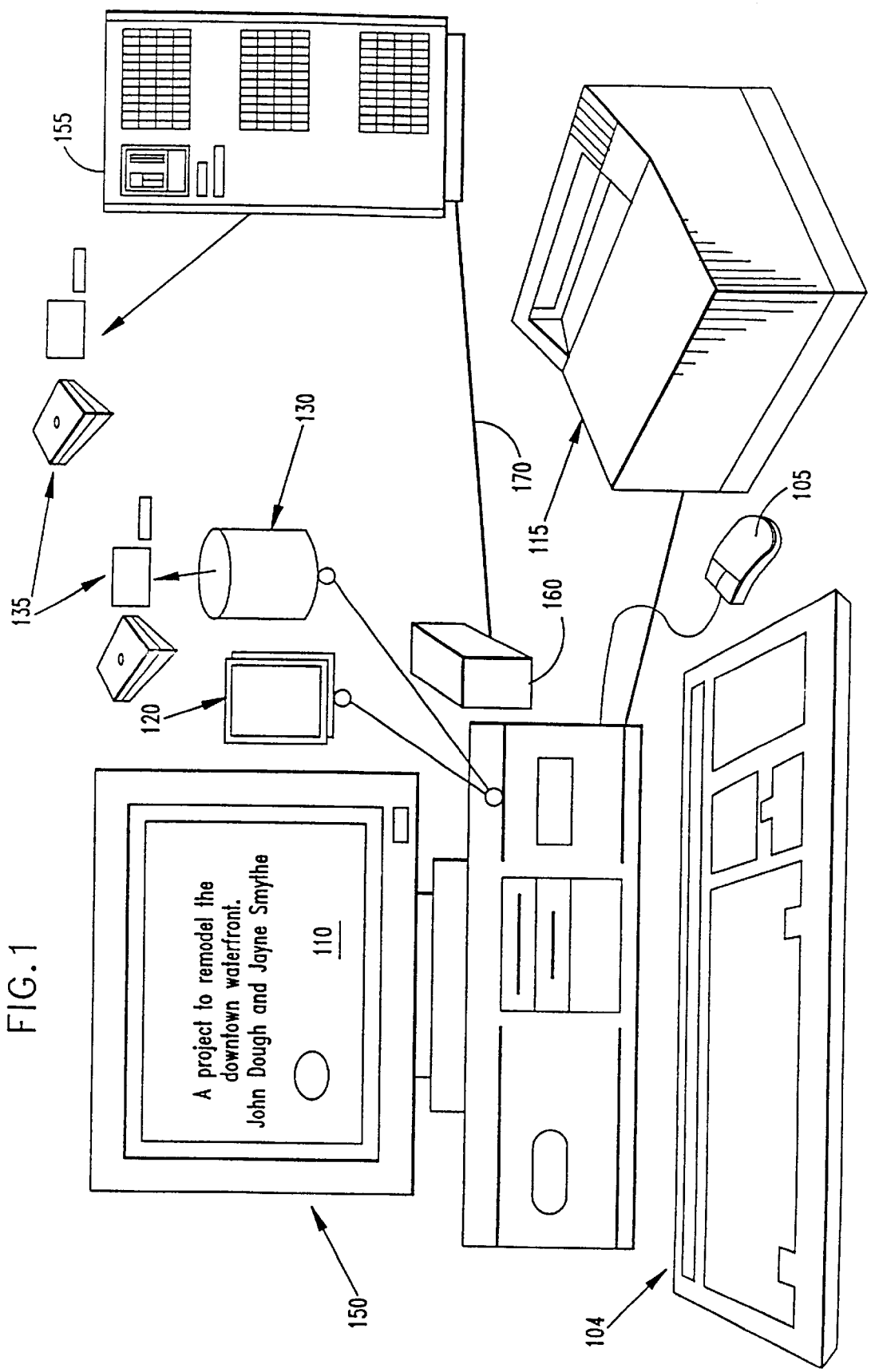
FIG. 1 is a block diagram of a general purpose Workstation/PC embodiment of the present invention, a taggable digital portfolio system, showing a display, keyboard, printer, and some text from a student project.

One preferred embodiment of this invention is shown in FIG. 1. The system comprises of one or more client workstations 150 such as the IBM PC Valuepoint or Power Macintosh running an operating system (OS) having a graphical user interface (GUI) 110 such as IBM OS/2 Presentation Manager, Microsoft Windows, or Macintosh System 7.5.

The workstation 150 has input devices such as a keyboard 104 and selection device (mouse) 105 and output devices 115, such as a printer. The workstation 150 also has one or more memories (main 120 and disk 130) on which process 600 (FIG. 6) and 800 (FIG. 8) are executed (and/or stored) and portfolios of work 135, goal lists 350, and comment lists 250, are stored. The computers are optionally connected to a network (e.g. a local area network (LAN) or wide area network (WAN), e.g. the Internet) 170 using technology such as the IBM Token Ring or Ethernet, and are thus connected through the general local area or wide area network 170 to one or more servers 155. The server 155 can also contain the portfolios of work 135, goal lists, and comment lists. Such a server computer may be an IBM PC Server or an RS/6000 server running OS/2, Windows NT., or AIX (IBM's version of UNIX OS). The hardware in this system and equivalents of this hardware are well known to those skilled in the art.

Valuepoint, OS/2, RISC System/6000, AIX, and IBM are trademarks of the International Business Machines Corporation. Windows and Windows NT are trademarks of the Microsoft Corporation. MacIntosh is a trademark of Apple Computer.

Other examples of networking applications are given in U.S. Pat. No. 5,371,852 to Attanasio et al. entitled "Method and Apparatus for Making a Cluster of Computers Appear as a Single Host on a Network", issued on Dec. 6, 1994, and U.S. patent application Ser. No. 08/677,059 to Brown et al., entitled "Identifying Duplicate Documents From Search Results Without Comparing Document Context", filed on Jul. 9, 1996, which both are herein incorporated by reference in their entirety.

In one preferred embodiment, a plurality of workstations or client computers 150, i.e. for student use, are connected to a network 170 of like client computers 150 using standard interface cards and wiring 160. The network also includes one or more server machines 155 containing the student projects and tables of goals (see FIG. 3) and possible comments (see FIG. 2).

Displays (200 and 300 in FIGS. 2 and 3, respectively) on these networked workstations can be accessed and used by authors and evaluators, respectively. Authors are any individuals that are responsible for generating documents or one or more portfolios of documents 135 that are to be evaluated by the evaluators.

Examples of authors include: students, employees, reporters, free lance authors, and lawyers. Examples of documents 135 or portfolios of documents 135 include: student assignments, work product (letters, forms, text, patent applications), and documents resulting from a search of a document database.

Evaluators are those that evaluate the documents/portfolios and/or the authors. Examples of evaluators include: teachers, administrators, parents, corporate managers, and anyone searching a database of text of multimedia documents.

In this disclosure 'student' will be used interchangeably with "author" and "teacher" will be used interchangeably with "evaluator," without any loss of generality.

Teachers can tag these documents with tags from data files. There are two types of tags: comments (see FIG. 2) and goals (see FIG. 3). Comments 260 are listed on one or more, comment data structures or lists 250. Goals 360 are listed on one or more goal data structures or lists 350. Goals are standardized. Standardization means that more than one of the evaluators has agreed on which goals 360 are on the goal list 350, i.e., the goals are predetermined. Optionally, the goals 360 have weights, scores, and can be nested. Goals 360 can be customized but are often measurable standards that have been adopted by some governing body, standards board, or management organization.

For example, goals 360 for education would include minimum state requirements for a given subject in a given grade level. In a corporate environment, goals 360 would include criteria on an employee performance or an award evaluation.

Comments 260 need not be standardized. Comments 260 are used by any user of the system to communicate impressions of the documents 135 and are often used to establish a dialog between the evaluator and the author. Note that for a given user, a given set of comments 260 can be used often enough to become a standard for that user.

These tags can indicate which curriculum goals 360 have been satisfied along with a numerical value (score) to indicate how well these goals have been satisfied. In addition, comments 260 can be used to evaluate the project and insert helpful information for the student.

Figure 2:
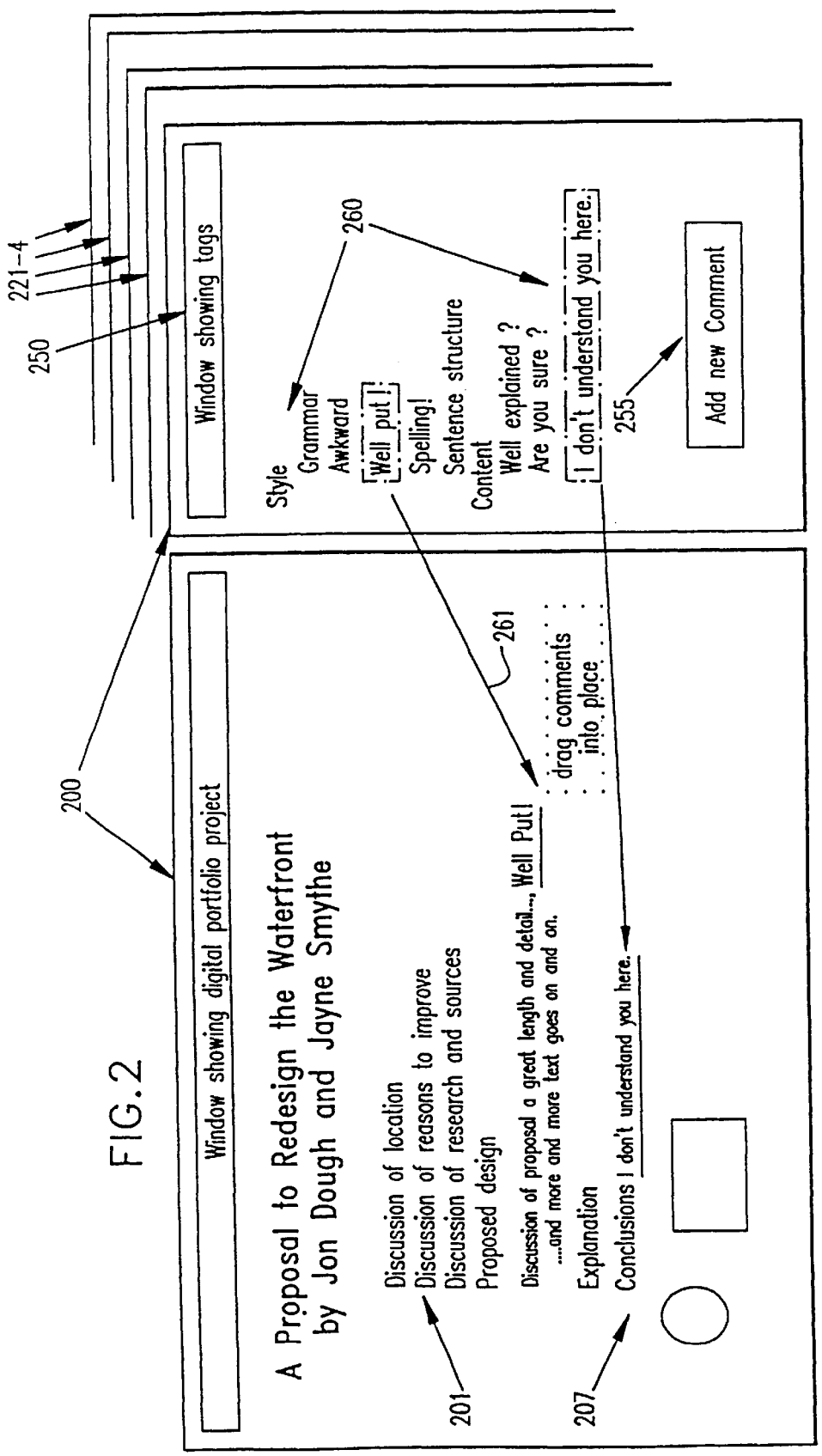
FIG. 2 is a block diagram showing a display of the taggable digital portfolio system, with a list of draggable curriculum goals shown on the right and the document on the left.

FIG. 2 is a block diagram of a graphical interface (110, 200) used by a evaluator (or others) to tag project elements, here phrases (typically 201–207), of a author portfolio with tags 260 relating the tagged phrase (201–207) to a comment of the evaluator on the document 135. The evaluator is presented with one or more tag windows (typically 221–224) that contain one or more comment lists 250. The comment list 250 can include lists of the following: general positive and negative phases that indicate typical evaluator responses when reviewing a document 135. There is also a provision for the evaluator to write in specific comments 255. Thus, the comments 260 on the comment lists 250 can be predetermined 260 but do not have to be 255.

Comments 260 (and goals 360, below) are dragged and dropped on one or more tagged phrases (201–207). Once dropped on the tagged phrase (201–207) the comment 260/goal 360 becomes associated with the tagged phrase by inserting a link to the comment data in the students work file. This link can be a standard HTML link or a more secure link of the sort provided by groupware systems such as Lotus Notes.

Dragging and dropping comments (and goals) on the portions of text of the work (201–207) is done by known techniques. The window containing the comment or goal to be dragged is Drag-enabled during software development and the window receiving the dropped information is likewise drop-enabled. When the user holds down the mouse button over a comment or goal window, an outline of that window appears and moves with the mouse. When the user moves that window outline over the target and raises the mouse button, that window is said to be dropped. When this drop occurs, a message is sent to the receiving window regarding the comment text to be inserted and the location where the insertion is to occur. The actual implementation of this text insertion can be an HTML link to another document containing the comment or goal or, in a Lotus Notes environment, a Notes link to another Notes document.

For example, the student work is shown in the left-hand window representing a document 135 on one computer screen 110. A second window, shown on the right, illustrates a series possible commentaries 250 on the student work 135 provided for the teacher, e.g., over the computer network 170. These comments can be customized, e.g. 255, by each teacher, e.g. to account for curriculum area and teaching style. Teachers can mark up the student documents by simply using the mouse to click on the comment in the right-hand window, and then dragging that comment text into the student document at the location of the tagged phrase (201–207). The comment is then stored with the student document 135 for viewing by students, teachers, parents and administrators. See FIG. 3.

Figure 3:
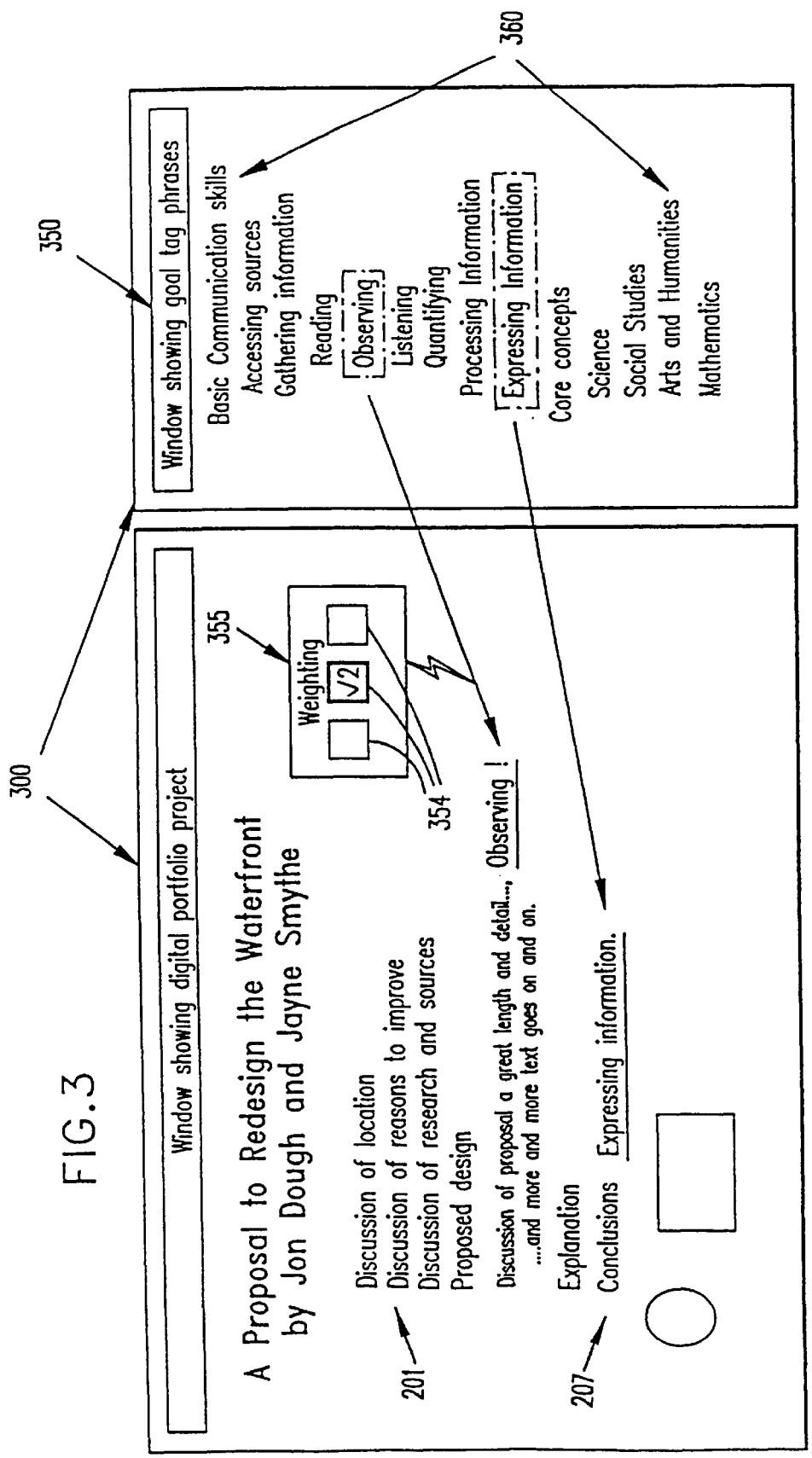
FIG. 3 is a drawing of a novel computer display showing how commentary or evaluation tags can be dragged onto a document, causing a pop-up window to be displayed, where weighting of the importance of that evaluation can be selected.

In FIG. 3, the evaluator uses the graphical interface (110, 300) to review the work (document 135) of the author and tag phrases (201–207) on the document 135 with selected predetermined goals 360. As above, the evaluator tags the tagged phrases (201–207) in the portfolio by clicking on a (predetermined/standardized) goal 360 in one of the goal lists 350 and dragging/dropping the tag/goal 360 on the tagged phrase. This process can also be performed by an outside reviewer, e.g., a parent, a school administrator, a higher level manager in a corporation, or other alternative evaluator.

For example, FIG. 3 has a list 350 of school-wide educational goals 360 which are provided for the teacher over the computer network 170. Here the goal list is located on the server 155. Teachers can drag and drop goals 360 to mark up tagged phrases (201–207) on the student work/document 135 with these goals 360, indicating which educational goals 360 have been satisfied.

Since there is one source (the server 155) for the goal list 350 containing the goals 360, all evaluators are forced to use the same predetermined goals (and weights, below) when tagging the tagged phrases (201–207). In this way the goals can be standardized.

Just as the server 155 can include different goal lists 350 with different goals (tags) 360 (e.g., goals for different levels of evaluator) and different comment lists 250 with different comments (tags) 360 (e.g., comments for different levels of evaluator), there can be several types evaluators that use the goal and comment tags.

These different types of evaluators can be provided for restricted access to and use of any one or more of the goals 360 and comment 260 tags. For example, in a Lotus Notes environment, access to any document can be restricted to a certain class of viewer such as a teacher, administrator, parent or manager. Such documents represent these comments or goals and are effectively invisible to those not authorized to view them.

For example, students can view the evaluation tags, but not the curriculum goals, while administrators can view the goals but may not necessarily view the evaluative tags. Teachers and parents may be able to view both kinds of tags. This is accomplished by assigning every user of the evaluation system network membership in one or more groups. It is these groups that then have access to these comments and goals. At any time, the privileges of any user or of any group can be changed to give them more or less ability to view these evaluations without any necessity of changing the markup of any document.

For example, in one preferred embodiment, the evaluator is a teacher and the author is a student. An overall evaluator is a school district administrator, and an outside evaluator is a parent. Here the goals generally deal with the education of the student. However, as an example, the teacher would tag with standardized goals that deal with the mastery of an aspect of a subject. The administrator would tag with goals that show the student achieved things that support the rating of the school district, and the parent would tag with goals that help the student be admitted to college.

As another example, the author is an employee, the portfolio is a digital representation of the employee's work, a first evaluator is a manager of a corporation, a second (overall) evaluator is a vice president of a department in which the employee works, and a third (outside) evaluator is a manager of a different department being serviced by the employee.

In one preferred embodiment, the evaluator(s) can weight one or more of the tags with a quality weight 354. The quality weight gives an indication of how well the author achieved the goal defined by the tag. The quality weight 354 is selected from a weight window 355 on the graphical interface 300. For example, the quality weight 354 can be presented as a checkbox scale, or slider bar, that allows the reviewer to select a quality weight 354 of 0–100% for any given tag.

These weighting factors are then stored as a field in the comment or goal documents and can be retrieved for reports on students, classes or any other useful grouping.

When the goal 360 is dropped onto the document 135, in a preferred embodiment, the weight window 355 pops up allowing the teacher to indicate the weighting 354 desired to be assigned to the goal 260. Such a weighting 354 could be used to represent the quality of the achievement.

In addition, an importance weight can be selected by a systems administrator or designer. The importance weight is assigned to a goal and will be the same for all evaluators. The importance weight is used to define how important a particular goal is to the systems administrator/designer.

In some preferred embodiments, the tags (comments 260 and goals 360) appear in a different color or style to indicate that it is markup text. In both HTML and Lotus Notes implementations, this occurs automatically.

FIG. 4 is a block diagram showing one preferred input file structure(405) used as a standard goals or commentary file. In a preferred embodiment, the comments 260/goals 360 are listed as a hierarchical set 405 of the type used to describe educational processes. These comments/goals are preceded by a number which includes their indentation or subsidiary level. The actually physical indentation is only for file readability and is not used to determine the subsidiary level. These hierarchical structures are well known. In an alternative preferred embodiment, the comments/goals can be stored in a flat file. This type of field structure is extremely efficient for teachers and school system computer administrators to implement and maintain and yet it provides sufficient information for a rather complex tree structure. Each level of goals is followed by a Tab character and another number indicating the relative importance of that goal or subgoal to that institution.

These goals are read in from the simple text files (405) and kept in a database table(410, 420) outside the student work and can be adjusted at any time to produce differently weighted reports as views of student needs and requirements change. In one preferred embodiment, this database consists of a table of goals (410) with columns representing the goal number or Key (411), the name of the goal (412) and the Key number of the parent of the goal (415) when they are stored hierarchically. A second table can contain the goal key values and goal importance values, making them easy to modify as educational needs change. If desired a table of the children or sub-goals of each goal (430) can also be generated when the goals are read in.

A Lotus Notes document command displays the file in FIG. 4 to create the window 350. Note that the software can assure that the importance weight of a category 425 is the sum of all the importance weights of the goals in that category.

FIG. 5 illustrates the internal structure 510 of the tagged document in HTML format as it is used in a networking embodiment. The tagged document as it actually appears to the reader is in the lower box 520. In the upper box, we show one preferred method for how these tags may be embedded in the student document using extensions to the standard HTML mark-up language used by World Wide Web browsers.

In the lower box 520, we illustrate how these tags will appear to the user. When a user clicks on one of the colored boxes, the goal or commentary tags appear as popup windows on the display. Alternatively, the system can include known functions called "balloon help" and "tooltips" which display small amounts of text after the mouse pointer hovers over them for a few seconds. This method requires a specific mouse click to keep the user from being distracted by information he did not wish to read at that moment. The implementation of this pop-up display requires customized extensions to the standard browser software environment.

FIG. 6 is a flow chart showing the process 600 steps of creating a database 700 (FIG. 7) of annotated author documents. The teacher or administrator selects 601 a student, selects 602 a student document, and then views 603 the document to locate areas to comment on. The user decides 604 where the comment is to be placed. The user then chooses 605 whether to add commentary or to mark the document with educational goals achieved.

If the choice 605 is a comment, he or she then selects a comment 606 with the mouse and drags 607 it over the area to which the comment applies and drops 608 it there by releasing the mouse button. Steps 605–608 can be repeated to choose more comments to annotate the document. The comments are then associated with the taggable phase (201–207) as described above.

Similarly, if the evaluator's choice 605 is a goal he or she then selects a goal 613 with the mouse and drags 614 it over the area to which the comment applies and drops 615 it there by releasing the mouse button. The weighting factor for the goal can be selected 616 from the popup window 355. Steps 613–616 can be repeated to choose more goals to annotate the document. These goals are then associated with the taggable phase (201–207) as described above.

If the evaluator has more annotation 609, the process returns to step 604, if not, the document is saved in the database 700. If there are more students 611, the process repeats at step 601. If not, the process exits 612.

FIG. 7 is a block diagram of a database of annotated author documents created by the goal creating process of FIG. 6. The student document (705, 707) is shown annotated with a comment (710) and with a goal (740). The comments are stored in a comment database consisting of the comments (730) and a table of relations between students, documents, comments and weights (720). Thus, for any given document or student, it is possible to produce a report of the comments and the teacher/evaluator grade on each of them. The example line in the relations table (720) shows that student 12 has a document number 9 where comment 3 has been entered with a weight of 75. The link between the student document (705) and the comment database can be either an HTML link to a database call or a Lotus Notes link to an analogous database fetch.

FIG. 7 also illustrates the method of including goals where both a teacher weighting and an importance value are represented. The student document (707) has a goal inserted with a hyperlink to the goal relations table(750) in the database. This table shows that goal 2 is linked to student 12, document 9, with a weight of 65. The goal-importance table(770) in the database shows an importance weight for goal 2 of 80. The goals table (760) shows a list of goals and their indices. When a report of goals achieved is generated, the teacher-assigned weight is multiplied by the importance value to return a computer achieved goal. In a more elaborate implementation the goals table (760) can be expanded to show parent-child relations between broader and more specific goals.

Figure 8:
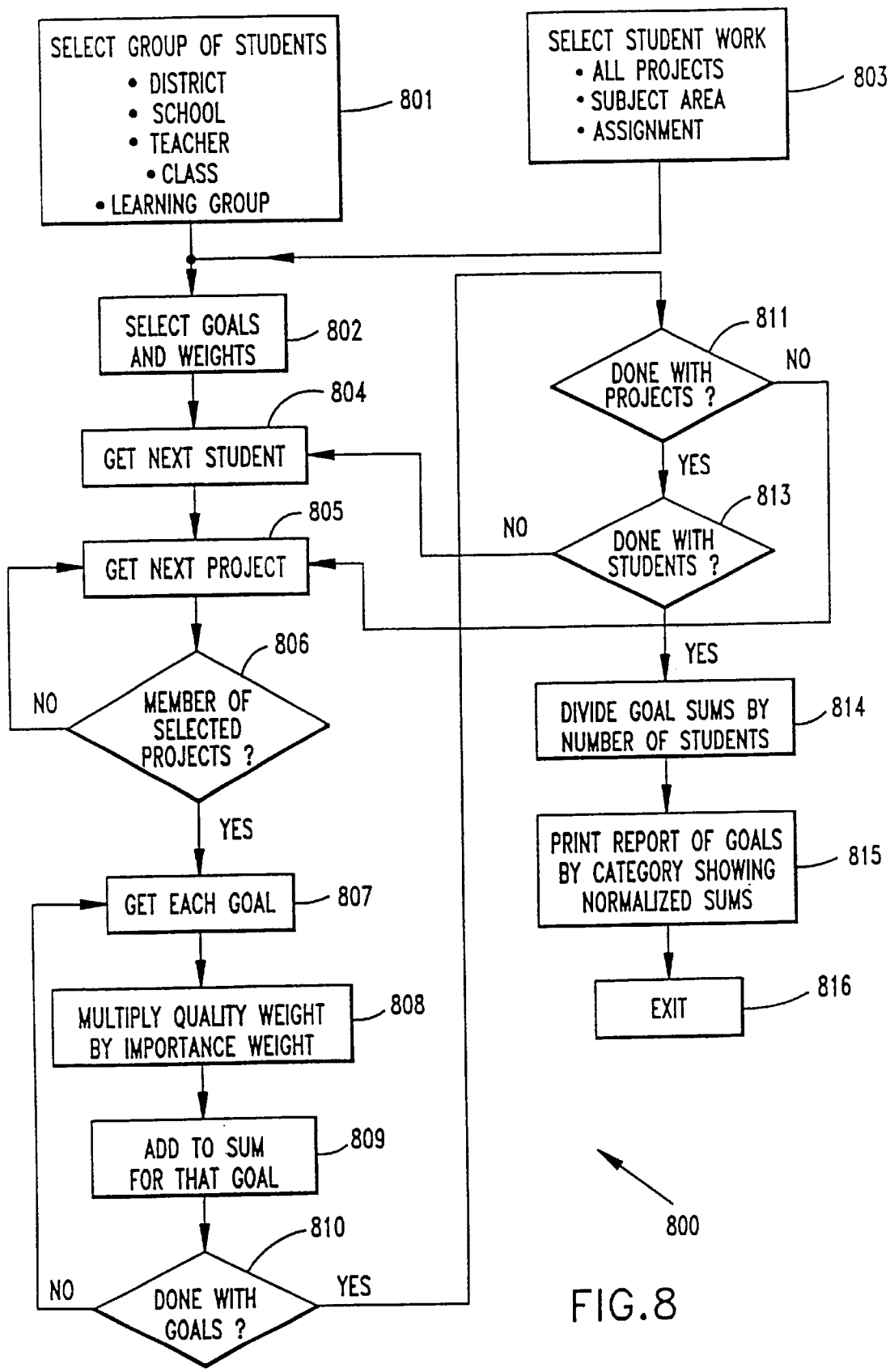
FIG. 8 is a flow chart showing the process steps of creating a report using the database in FIG. 7.

FIG. 8 is a flow chart showing the process steps of creating a report using the database in FIG. 7. We illustrate the steps needed to create a report of goals achieved for a given group of students. The user selects the group 801 to be reported on and the goals and weights 802 to be used. The user may also select which categories of student work 803 are to be reported on. The for each student 804, the program selects each student project 805 and determines whether that project is one from the group 806 for which the report is being generated. If the given student project is a member of the desired project group, the program examines each goal 807 in that project and multiplies the quality of that goal's execution 808 by the assigned importance weight (from 802) and sums those products 809. When all goal in the given project have been read 8 10, the program goes on to the remaining projects 811 and then on to the remaining students 813 in the selected group.

Once the entire student set has been examined, the goals summation is normalized by dividing the number of students 814 and a printed or electronic (webpage) report is generated 815.

Given this disclosure alternative equivalent embodiments will become apparent to those skilled in the art. These embodiments are also within the contemplation of the inventors.

Having thus described our invention, what we claim as new and desire to secure by Letters Patent is as follows:

1. A multimedia computer system for storing and accessing information about a digital portfolio of projects, comprising:

a memory for storing one or more digital portfolios generated by one or more authors, each digital portfolio having one or more projects, each project having one or more project elements, wherein a project element is selected from the group consisting of textual, graphical, audio, and another digitally storable multimedia format;

a graphical user interface on a computer display for displaying in a first window a digital portfolio project and in a second window a tag list of tags with a predetermined set of tags from which an evaluator can choose; and a tagging process that tags one or more project elements with a tag to produce tagged project elements, each of the tagged project elements being associated with the respective tag, one or more of the tags being selected by the evaluator from the tag list with a predetermined set of tags, the tags being stored separately from the original tagged project elements to maintain integrity of the original project elements, and tagged project elements being stored in said memory as a database of annotated author documents, wherein the database is relational.

2. A system as in claim 1, where one or more of the project elements is associated with the respective tag with a link in the project containing the project element, the link created by an evaluator and stored in a file separate from the project element, the link being visible only to authorized users.

3. A system as in claim 2, wherein the link is a HyperText Markup Language (HTML) link.

4. A system as in claim 1, where one or more of the tagged components is tagged by selecting the tag with a pointing device and selecting the tagged component with the pointing device, the tag being stored in a file separate from the tagged component.

5. A system, as in claim 1, where the tag list with a predetermined set of tags is a standardized set of evaluator comments and the tagged project element is annotated by a comment selected by the evaluator from the standardized set of evaluator comments by the respective tag.

6. A system, as in claim 5, where the second window further includes a comment field in which an evaluator can optionally enter a comment which is associated with the tagged project element.

7. A system as in claim 1, where an element characteristic of the tagged project element changes when the tagged project element is tagged, the tagged element itself remaining unchanged.

8. A system as in claim 7, where the tagged project element is text and the element characteristic includes any one or more of the following: color, font, underscoring, unique icon.

9. A system as in claim 7, where the tagged project element is a multimedia object and the element characteristic includes any one or more of the following: color, sound, sound identifier, play speed.

10. A system as in claim 1, where the set of tags is predetermined by one or more evaluators of the portfolio.

11. A system as in claim 10, where the portfolio is generated by a student and the evaluators are any one or more of the following: a teacher, a school official, a school system official, and a government official.

12. A system as in claim 10, where the portfolio is generated by an employee and the evaluator is a manager.

13. A system as recited in claim 1, wherein said system is used in an educational environment, the projects are authored by a student or a trainee, the evaluator is a teacher or administrator, the predetermined set of tags are determined by a group of evaluators in order to standardize a grading process, and a user of the system is able to view a subset of all tags associated with a project based on the user's authority level.

14. A computer implemented method for storing and accessing information in a database of annotated author documents comprising the steps of:

responding to a selection by an evaluator of an author and a particular document by displaying the selected document in a first window of a graphical user interface;

displaying in a second window of the graphical user interface a tag list of tags with a predetermined set of tags from which the evaluator can choose;

receiving a selection by the evaluator of a portion of the displayed document by an evaluator;

receiving a selection by the evaluator of one or more tags from the list of tags;

associating one or more selected tags with the selected portion of the displayed document; and saving the document and one or more tags in the database as an annotated document, wherein the tags are stored separately from the original displayed document to maintain integrity of the original document, and the tags and document are stored in memory as a relational database of annotated author documents.

15. The computer implemented method, as in claim 14, where the tag list with a predetermined set of tags is a standardized list of evaluator comments and the tagged portion of the document is annotated by a comment selected by the evaluator from the standardized set of evaluator comments by the respective tag.

16. The computer implemented method, as in claim 15, where the tag list with a predetermined set of tags is optionally a list of goals and the tagged portion of the document is annotated by a goal selected by the evaluator from the set of goals by the respective tag.

17. The computer implemented method, as in claim 15, where the second window further includes a comment field in which an evaluator can optionally enter a comment which is associated with the tagged portion of the document.

18. The computer implemented method, as in claim 14, wherein the tag list with a predetermined set of tags is a list of goals and the tagged portion of the document is annotated by a goal selected by the evaluator from the set of goals by the respective tag and a quality weight to indicate how well the author has met the selected goal.

19. The computer implemented method, as in claim 18, where each goal is part of a tree of goals and subgoals, wherein the subgoals may be summed to higher levels to indicate how well an author has satisfied goals by multiplying the quality weight of the goal's execution by an assigned importance weight and summing those products.